US012065991B2

(12) United States Patent
Norman et al.

(10) Patent No.: US 12,065,991 B2
(45) Date of Patent: Aug. 20, 2024

(54) HIGH TEMPERATURE THERMAL PROTECTION SYSTEM FOR ROCKETS, AND ASSOCIATED METHODS

(71) Applicant: Blue Origin, LLC, Kent, WA (US)

(72) Inventors: Adam Keith Norman, Maple Valley, WA (US); John Paul Brendel, Lake Tapps, WA (US); Christopher Patrick Hupf, Maple Valley, WA (US); Stefano Gulli, Bellevue, WA (US)

(73) Assignee: BLUE ORIGIN, LLC, Kent, WA (US)

( * ) Notice: Subject to any disclaimer, the term of this patent is extended or adjusted under 35 U.S.C. 154(b) by 465 days.

(21) Appl. No.: 17/514,471

(22) Filed: Oct. 29, 2021

(65) Prior Publication Data
US 2022/0099047 A1 Mar. 31, 2022

Related U.S. Application Data

(63) Continuation of application No. 16/409,195, filed on May 10, 2019, now Pat. No. 11,174,818.
(Continued)

(51) Int. Cl.
*B64G 1/58* (2006.01)
*B32B 5/02* (2006.01)
(Continued)

(52) U.S. Cl.
CPC .............. *F02K 9/974* (2013.01); *B32B 5/024* (2013.01); *B32B 5/26* (2013.01); *B32B 7/027* (2019.01);
(Continued)

(58) Field of Classification Search
CPC . F02K 9/97; F02K 9/972; F02K 9/974; B32B 5/024; B32B 5/26; B32B 5/06;
(Continued)

(56) References Cited

U.S. PATENT DOCUMENTS 2,908,455 A * 10/1959 Hoadley .............. B64D 13/006
156/197
2,922,291 A * 1/1960 Fox ...................... B64D 13/006
62/133
(Continued)

FOREIGN PATENT DOCUMENTS

JP 02078762 A * 2/1990
JP H-0278762 3/1990
(Continued)

OTHER PUBLICATIONS

NASA, Protective Coatings, 1996, NASA Technology Transfer Program (Year: 1996).*
(Continued)

*Primary Examiner* — Kyle Robert Thomas
(74) *Attorney, Agent, or Firm* — Hogan Lovells US LLP

(57) ABSTRACT

A high temperature thermal protection systems for rockets, and associated methods, is disclosed. A representative system includes a launch vehicle having a first end and a second end generally opposite the first end. The launch vehicle is elongated along a vehicle axis extending between the first and second ends and carries a propulsion system having at least one nozzle positioned at the second end of the launch vehicle. A thermal protection apparatus positioned around the nozzle is used to provide cooling and/or insulation to the nozzle during the flight of the launch vehicle. The thermal protection apparatus can include multiple fabric layers and an insulation layer stacked and stitched together. The fabric layers can include metal alloy fibers. In representative systems, the thermal protection apparatus can further include provisions for water that saturates the insulation layer to provide further insulating and/or cooling effects.

42 Claims, 7 Drawing Sheets

Related U.S. Application Data

(60) Provisional application No. 62/669,830, filed on May 10, 2018.

(51) Int. Cl.

| | | |
|---|---|---|
| *B32B 5/26* | (2006.01) | |
| *B32B 7/027* | (2019.01) | |
| *B32B 7/09* | (2019.01) | |
| *B32B 7/12* | (2006.01) | |
| *B64G 1/22* | (2006.01) | |
| *F02K 9/97* | (2006.01) | |

(52) U.S. Cl.
CPC .................. *B32B 7/09* (2019.01); *B32B 7/12* (2013.01); *B64G 1/226* (2013.01); *B64G 1/58* (2013.01); *F02K 9/97* (2013.01); *F02K 9/972* (2013.01); *B32B 2262/103* (2013.01); *B32B 2262/105* (2013.01); *B32B 2307/304* (2013.01); *B32B 2605/00* (2013.01); *B32B 2605/18* (2013.01)

(58) Field of Classification Search
CPC ........... B32B 5/022; B32B 7/12; B32B 7/027; B32B 2605/00; B32B 2262/105; B32B 2262/103; B32B 2307/304; D10B 2403/023; D10B 2403/0231
See application file for complete search history.

(56) References Cited

U.S. PATENT DOCUMENTS

| | | | | |
|---|---|---|---|---|
| 3,138,009 | A | * | 6/1964 | Mccreight ............ B64D 13/006 62/239 |
| 3,318,064 | A | | 5/1967 | Mayfield |
| 3,612,447 | A | | 10/1971 | Newsom |
| 3,700,171 | A | * | 10/1972 | Parilla ..................... F02K 9/972 239/127.3 |
| 4,456,208 | A | | 6/1984 | MacConochie et al. |
| 4,499,134 | A | | 2/1985 | Whitely |
| 4,619,553 | A | | 10/1986 | Fischer |
| 4,713,275 | A | | 12/1987 | Riccitiello et al. |
| 4,877,689 | A | | 10/1989 | Onstott |
| 4,919,366 | A | | 4/1990 | Cormier |
| 5,030,518 | A | | 7/1991 | Keller |
| 5,038,693 | A | | 8/1991 | Kourtides |
| 5,209,433 | A | * | 5/1993 | Alexander ............... B64G 5/00 182/12 |
| 5,322,725 | A | * | 6/1994 | Ackerman ............... B64G 1/58 428/137 |
| 5,451,448 | A | | 9/1995 | Sawko et al. |
| 5,626,951 | A | * | 5/1997 | Hogenson ................ B32B 5/26 428/920 |
| 5,740,985 | A | | 4/1998 | Scott et al. |
| 5,803,406 | A | | 9/1998 | Kolodziej |
| 5,811,168 | A | | 9/1998 | Raksy et al. |
| 6,293,496 | B1 | | 9/2001 | Moe |
| 6,418,973 | B1 | | 7/2002 | Cox |
| 6,497,390 | B1 | | 12/2002 | Fischer |
| 6,827,312 | B2 | | 12/2004 | Riedell |
| 7,485,354 | B2 | | 2/2009 | Bohner et al. |
| 7,510,754 | B2 | | 3/2009 | DiChiara |
| 8,147,943 | B1 | | 4/2012 | Byrd |
| 9,290,865 | B2 | | 3/2016 | McClain |
| 11,174,818 | B2 | | 11/2021 | Norman |
| 2011/0318531 | A1 | | 12/2011 | Krusch |
| 2016/0031180 | A1 | | 2/2016 | Baroux et al. |
| 2017/0218542 | A1 | | 8/2017 | Stewart et al. |

FOREIGN PATENT DOCUMENTS

| | | |
|---|---|---|
| RU | 2016348 | 7/1994 |
| RU | 2142596 | 12/1999 |
| RU | 2344972 | 1/2009 |
| RU | 2583532 | 5/2016 |
| RU | 2622181 | 6/2017 |
| RU | 179194 | 5/2018 |

OTHER PUBLICATIONS

Bergin, Chris, "SLS Program Pressing Forward with Engine Heat Shield Design Change," NASASpaceFlight.com, Sep. 3, 2012, 4 pages.

ASM Aerospace Specification Metals Inc., Special Metals INCONEL Alloy 718, 2005, 3 pages.

International Search Report and Written Opinion for International Patent Application No. PCT/US2019/031753, Applicant: Blue Origin, LLC., mailed Sep. 12, 2019, 9 pages.

* cited by examiner

HIGH TEMPERATURE THERMAL PROTECTION SYSTEM FOR ROCKETS, AND ASSOCIATED METHODS

CROSS-REFERENCE TO RELATED APPLICATION

This application is a continuation of U.S. patent application Ser. No. 16/409,195, filed on May 10, 2019, which claims the benefit of and priority to U.S. Provisional Patent Application No. 62/669,830, titled "HIGH TEMPERATURE TRANSPIRATION COOLED THERMAL PROTECTION SYSTEM FOR ROCKETS, AND ASSOCIATED METHODS" and filed May 10, 2018, each of which is incorporated herein in its entirety by reference.

TECHNICAL FIELD

The present technology relates to thermal protection systems for rockets that cool and/or insulate the rocket during flight.

BACKGROUND

Rocket manufacturers continually strive to reduce the cost of launching a payload into space. One approach for reducing such costs is to retrieve one or more booster stages used to propel the space launch vehicle. In a particular approach, the booster is launched and landed vertically and refurbished for another launch. One drawback to this approach is that the exterior surfaces of the booster, including the engine nozzles, are subjected to high temperatures, which can result in damage to these surfaces during ascent and/or descent. To overcome this drawback, launch and reentry vehicle manufacturers utilize insulation and cooling systems designed to reduce the amount of heat the engine nozzles and/or other surfaces are exposed to during flight. Conventional types of insulation include single-use insulation (which must be replaced after every rocket launch), metal shielding (which can change shape due to thermal expansion when subjected to high temperatures), and insulating tiles and blankets (which are not very robust and which often require refurbishment between launches). For example, conventional insulating blankets, such as the Advanced Flexible Reusable Surface Insulation (AFRSI) used on the space shuttle, are formed from silica insulation and quartz fabric and threads, which stitch the insulation and fabric together with a square stitching pattern. Quartz fibers are typically not very durable and are easily damaged if impacted during flight. Accordingly, there is a need for an improved thermal protection system for reusable launch vehicles.

DETAILED DESCRIPTION

Figure 1:
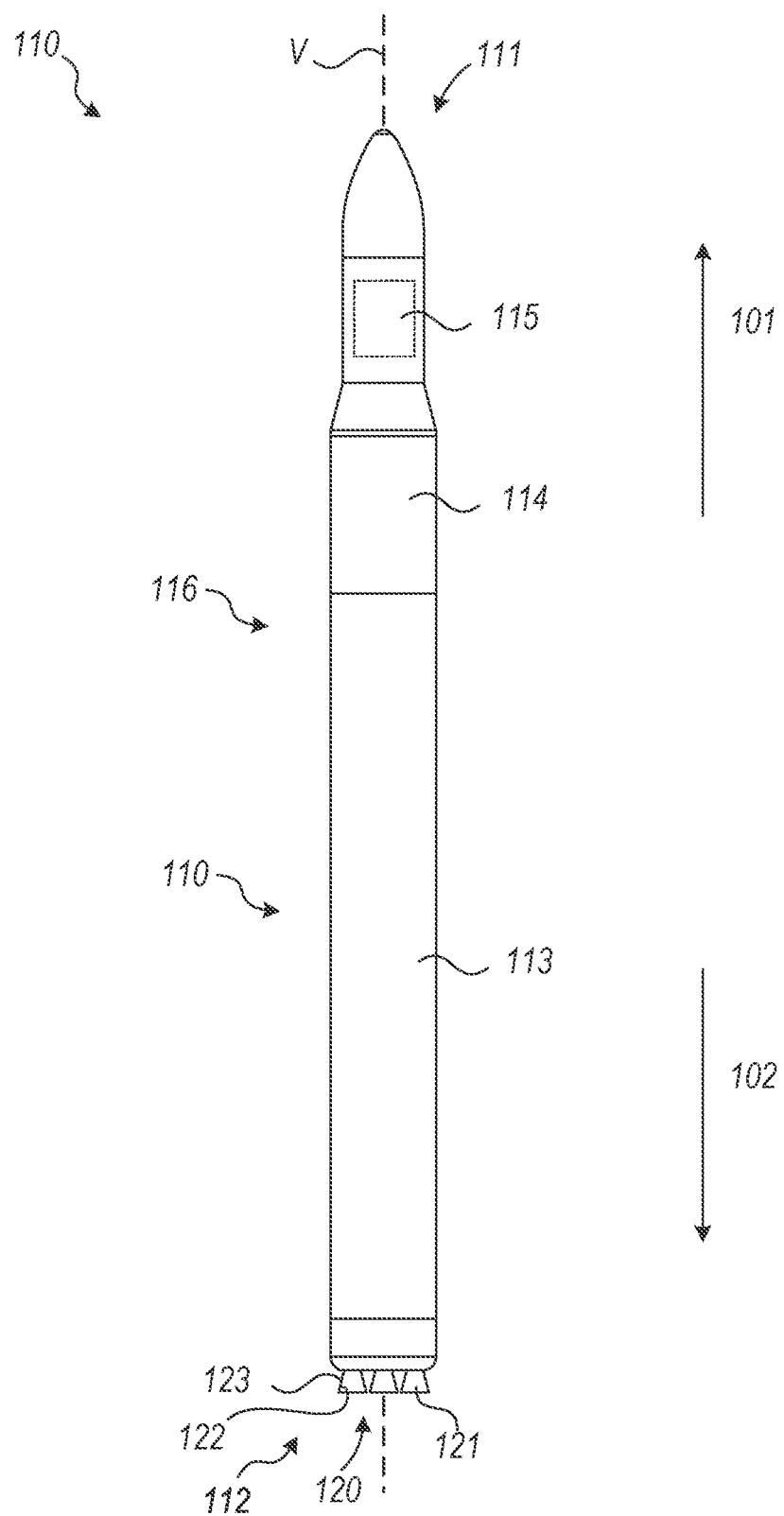
FIG. 1 is a partially schematic, side elevation view of a representative launch vehicle system having cooling/insulation systems configured in accordance with embodiments of the present technology.

Several embodiments of the present technology are directed to systems and apparatuses for cooling and/or insulating rocket engine nozzles and other launch vehicle components in order to reduce the effects of heat on the components. For example, the present technology can include a flexible thermal protection apparatus having an insulation layer positioned between two fabric layers. The insulation layer and the fabric layers can be stitched together with a tight stitching pattern using thread. The outermost fabric layers and/or the thread can be formed from a metal that provides impact resistance and improves the durability of the thermal protection apparatus. In some embodiments, the thermal protection apparatus can be attached to the rocket components using adhesive and the apparatus can be saturated with water. This approach can utilize the high heat capacity and high heat of vaporization of water to insulate launch vehicle components when the launch vehicle reenters the atmosphere and lands. For example, when exposed to high temperatures, water trapped within the thermal protection apparatus can be heated to a temperature at or near the boiling point of water. As the water vaporizes, it can transpire out of the thermal protection apparatus, thereby removing the energy from the thermal protection apparatus. Further, as the vaporized water moves out of the thermal protection apparatus, it can absorb additional energy from the outer layers of the thermal protection apparatus. As a result, the thermal protection apparatus can absorb a large amount of heat that would otherwise be absorbed by the rocket engine nozzles and other launch vehicle components.

Specific details of several embodiments of the disclosed technology are described below with reference to particular, representative configurations. The disclosed technology can be practiced in accordance with launch vehicles, rocket engine nozzles, and/or insulation having other suitable configurations unrelated to launch vehicle applications. Specific details describing structures or processes that are well-known and often associated with launch vehicles and insulation but that can unnecessarily obscure some significant aspects of the presently disclosed technology, are not set forth in the following description for purposes of clarity. Moreover, although the following disclosure sets forth some embodiments of different aspects of the disclosed technology, some embodiments of the technology can have configurations and/or components different than those described in this section. Further, unless otherwise specifically noted, elements depicted in the drawings are not necessarily drawn to scale. As such, the present technology can include some embodiments with additional elements and/or without several of the elements described below with reference to FIGS. 1-8.

FIG. 1 is a partially schematic elevation view of a system 100 that includes a launch vehicle 110 having opposing first and second ends 111 and 112 and that is capable of ascending and descending in opposite directions but with generally the same orientation (e.g., a tail-down orientation). Accordingly, the launch vehicle 110 can ascend in a first direction 101 and descend in a second direction 102. The launch vehicle 110 includes a first stage 113 (e.g., a booster) and a second stage 114 that can carry a payload 115 (e.g., one or more humans, supplies, experiments, etc.). In other embodiments, the launch vehicle 110 can include more than two stages and/or a crew capsule or other type of space vehicle. The launch vehicle 110 is elongated along a vehicle axis V and the payload 115 can be positioned at the first end 111. The launch vehicle 110 can include a pre-determined separation location 116 at which the first stage 113 separates from the second stage 114, during ascent of the launch vehicle 110. The launch vehicle 110 can also include landing gear that supports the launch vehicle 110 when it is not airborne or space-borne. The launch vehicle 110 can also include one or more elements (e.g., fins) that provide stability and control for the launch vehicle 110 during flight.

The first stage 113 of the launch vehicle 110 includes a propulsion system 120 positioned at the second end 112 and having a plurality of nozzles 121 oriented to direct exhaust products in a generally downward direction (i.e. in the second direction 102). Each of the nozzles 121 can be a de Laval nozzle having a generally frustoconical shape and having an exterior surface 123 and an interior surface 122. The nozzles 121 are typically formed from metal (e.g., copper) and can include multiple layers of different metals, such that the exterior surface 123 can include a first metal while the interior surface 122 includes a second metal (e.g., a metal different from the first metal). In some embodiments, the propulsion system 120 can include seven nozzles 121. In other embodiments, however, the propulsion system 120 can include just a single nozzle 121, or can include between two and six nozzles 121, or can include more than seven nozzles 121. The propulsion system also includes one or more combustion chambers located within the body of the launch vehicle 110, with each of the nozzles 121 coupled to a given one or more of the combustion chambers. Each of the combustion chambers receives fuel from a fuel pump coupled to a fuel tank. An igniter ignites the fuel within the combustion chamber, creating high energy exhaust products that are directed through the associated nozzle 121. Each of the nozzles 121 is positioned to direct the exhaust products away from the second end 112 of the launch vehicle 110 (e.g., in the second direction 102), thereby generating thrust that pushes the launch vehicle in the first direction 101.

Once the launch vehicle 110 reaches a specific and pre-determined point in the launch process (e.g., a specific altitude or speed, a specific amount of fuel consumed, anomaly detection, etc.), the first and second stages 113 and 114 separate from each other at the separation location 116. In some embodiments, the second stage 114 includes a secondary propulsion system used to propel the second stage 114 towards its final destination after the first and second stages 113 and 114 separate, while the first stage 113 returns back to Earth. In other embodiments, the second stage 114 does not include a secondary propulsion system and/or both the first and second stages 113 and 114 return to Earth after separation. The first stage and second stages 113 and 114 can also include lateral thrusters coupled to the first stage and second stages 113 and 114 used to stabilize and control the first stage and second stages 113 and 114. Further details of the lateral thrusters are included in pending U.S. Published Patent Application No. US 2017/0349301, incorporated herein by reference.

As the first stage 113 descends, the propulsion system 120 and the lateral thrusters work together to control the orientation and speed of the first stage 113. In a representative embodiment, the propulsion system 120 and the lateral thrusters control the descent of the first stage 113 such that first stage 113 moves in the second direction 102 and the vehicle axis V is generally parallel to the second direction 102. As it approaches the landing site, the first stage 113 can have a generally vertical orientation such that the second direction 102 and the vehicle axis V are both oriented perpendicular to the ground and the one or more nozzles 121 direct the exhaust products downwards, causing the first stage 113 to decelerate. Landing gear, which can be stowed away during ascent and descent, extends from the body of the first stage 113 and supports the weight of the first stage 113 as it lands. Once the first stage 113 lands, the propulsion system 120 shuts down and the first stage 113 is secured to the landing site. The landing site can include a platform in a body of water. In this way, the first stage 113 can be used for subsequent launches and only minor refurbishments and part replacements may be required between subsequent launches of the first stage 113.

Throughout the launching and landing processes, the launch vehicle 110 is subjected to extreme conditions. For example, the nozzles 121 are exposed to large amounts of heat during the ascent as the fuel is ignited and the nozzles 121 expel the exhaust products. Further, as it reenters and descends through the atmosphere, the second end 112 of the first stage 113 is subjected to high air pressures and temperatures caused by friction between the air and the second end 112. To reduce the effects of the high temperatures, the launch vehicle 110 includes a thermal protection system that includes shielding, insulation, active cooling, and/or other elements or sub-systems. For example, referring now to FIG. 2, a representative thermal protection system 130 can include a heat shield 131 positioned at the second end 112 to insulate the first stage 113. The thermal protection system 130 can be applied to other surfaces of the launch vehicle in addition to or in lieu of the surfaces shown in FIG. 2. The thermal protection system 130 can also include a thermal protection apparatus 140, a cut-out portion 141 of which is shown in further detail in FIG. 3. Each nozzle 121 has an interior surface 122 (in contact with the exhaust products), and an exterior surface 123 against which the thermal protection apparatus 140 is positioned, as further described below with reference to FIG. 3.

Figure 2:
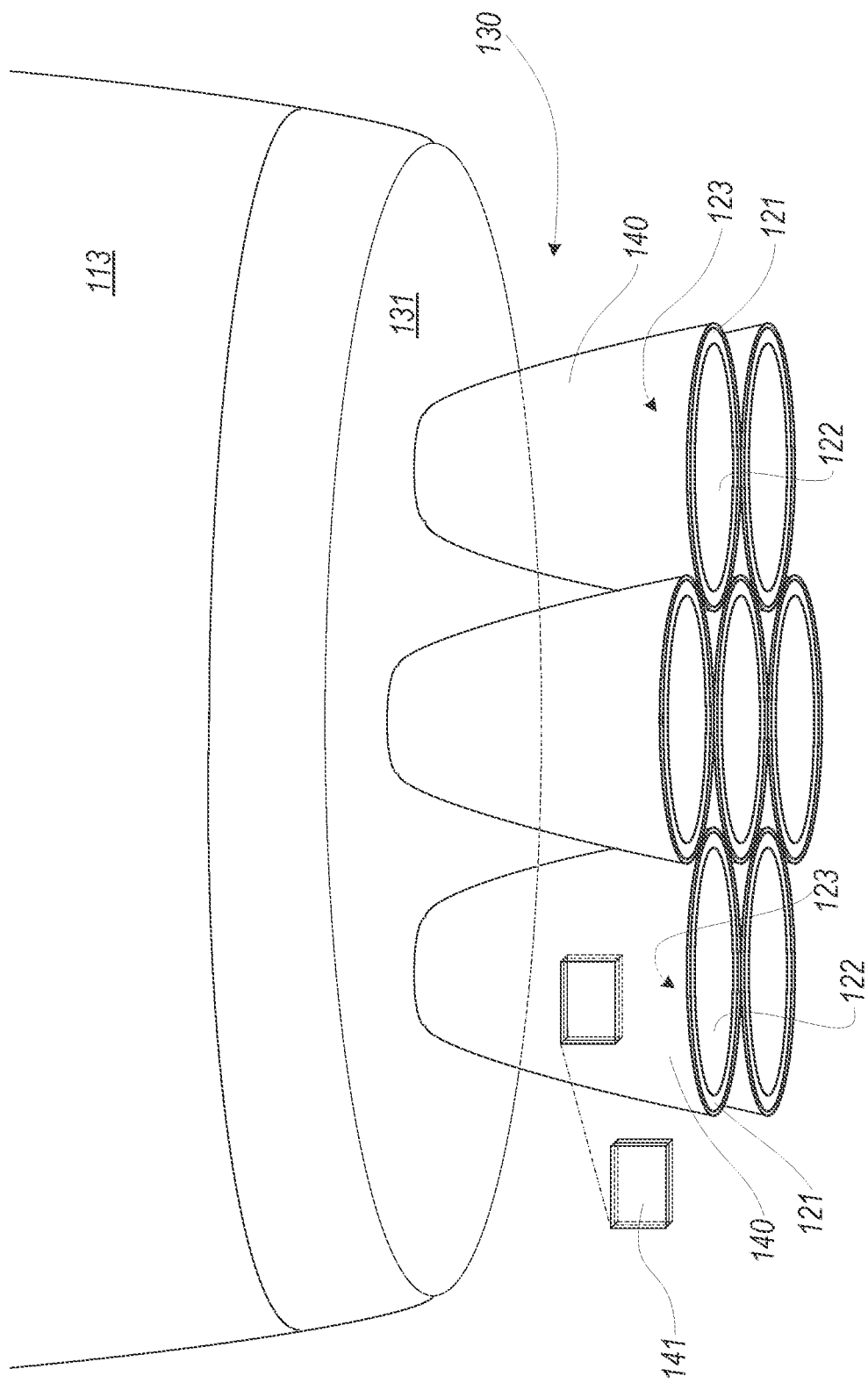
FIG. 2 is an enlarged, partially schematic, isometric view of one end of the launch vehicle of FIG. 1 having a thermal protection apparatus positioned around the nozzles, in accordance with embodiments of the present technology.
Figure 3:
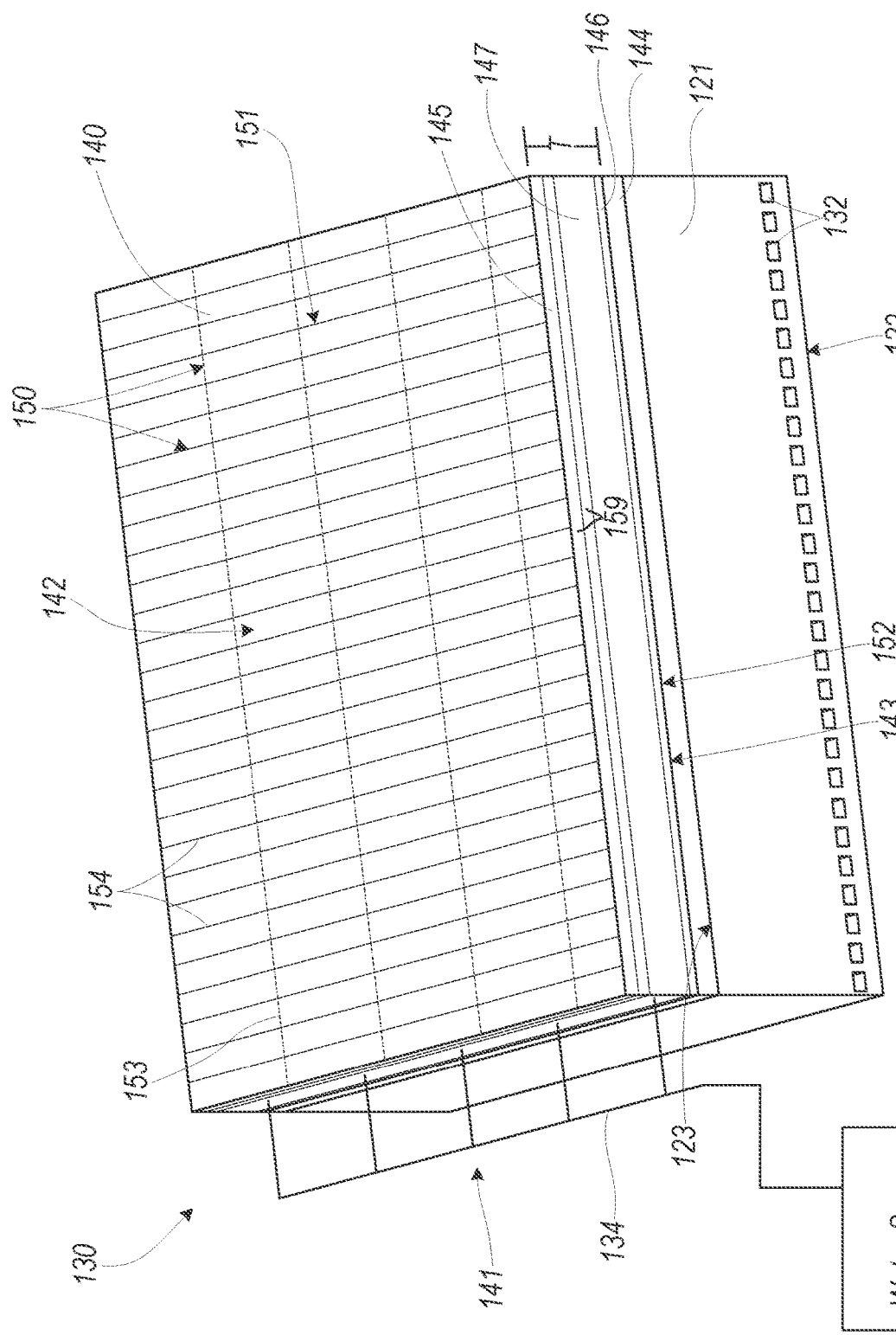
FIG. 3 is an enlarged partially schematic view of a cut-out portion of the thermal protection apparatus shown in FIG. 2.

FIG. 3 shows an enlarged view of the cut-out portion 141 of the thermal protection apparatus 140 and nozzle 121. The thermal protection system 130 can include a regenerative cooling system, which is coupled to the propulsion system 120 shown in FIG. 2. The regenerative cooling system utilizes a fuel pump to pump cool fuel through channels 132 positioned between the interior surface 122 and the exterior surface 123 of each of the nozzles 121 to cool the nozzles 121. However, the propulsion system can be inactive for portions of the vehicle descent, and the regenerative cooling system can therefore be incapable of providing sufficient cooling to the nozzles 121 during the descent. In order to provide sufficient cooling to the exterior surface 123 of the nozzles 121, and therefore prevent the nozzles 121 from deforming or degrading due to the high temperatures associated with re-entry and descent, the thermal protection apparatus 140 can provide cooling independent of the propulsion system. For example, in some embodiments, water can be pumped into the thermal protection apparatus during re-entry and descent without the propulsion system being active.

In a representative embodiment, the thermal protection apparatus 140 is coupled to the exterior surfaces 123 of each of the nozzles 121. Accordingly, the thermal protection apparatus 140 can be generally flexible, and can be sized and shaped to conform to the curved exterior surfaces 123. In the illustrated embodiment, the thermal protection apparatus 140 is wrapped around an individual nozzle 121 such that the entire exterior surface 123 of the nozzle 121 is covered. In other embodiments, only a portion of the exterior surface 123 may be covered. For example, in some embodiments, only the bottom portion of the exterior surface 123 of each nozzle 121 is covered while the top portion is uncovered.

As shown in FIG. 3, the thermal protection apparatus 140 can include an outer fabric layer 145 that defines an outer surface 142 of the apparatus 140, an inner fabric layer 146 that defines an inner surface 143 of the apparatus 140, and a layer of insulation 147 between the fabric layers 145 and 146. The thermal protection apparatus 140 can be securely attached to the nozzle 121 using an adhesive 144 applied between the exterior surface 123 of the nozzle 121 and the inner surface 143, or via another attachment process. The adhesive 144 is generally a high temperature adhesive and can be embedded within the inner fabric layer 146 prior to the apparatus 140 being attached to the nozzle 121.

In representative embodiments, the outer fabric layer 145 is formed from a fabric having strength and oxidation resistance at high temperatures. In some embodiments, the outer fabric layer 145 can include metal alloy fibers (e.g., fibers of Inconel alloys available from Special Metals Corporation or Haynes 230® available from Haynes International). Such fibers have high strength and resist oxidation when exposed to high temperatures (e.g., up to 2100° F.) for prolonged periods of time, have excellent long-term stability, are easily fabricated and formed, and/or have high impact resistance. As such, the metal alloy fibers can improve the durability and strength of the apparatus 140, which can improve the longevity of both the apparatus 140 and the nozzle 121 to which it is attached. In other embodiments, the outer fabric layer 145 can be formed from quartz fibers (e.g., formed from Astroquartz® available from JPS Composite Materials), which are capable of withstanding high temperatures for short periods of time and have a low density, and/or ceramic fibers (e.g., formed from Nextel™ 440 available from 3M), which can withstand extremely high temperatures (e.g., up to 2500° F.) for short periods of time without degradation. In general, the outer fabric layer 145 can be formed from any suitable material that has high thermal resistance and is capable of withstanding high temperatures without significant deformation or degradation.

In representative embodiments, the outer fabric layer 145 can have an angle-interlock architecture. Fabrics having an angle-interlock architecture include a plurality of layers of weft fibers stacked on top of each other and woven together with warp fibers that weave between the weft fiber layers. The individual weft fiber layers can be selectively oriented with respect to each other by angling the individual layers relative to each other. In the illustrated embodiment, the outer fabric layer 145 includes two layers 159 of weft fibers layered on top of each other and woven together with warp fibers. With this angle-interlocked architecture, the outer fabric layer 145 remains generally flexible while also providing durability and improved impact resistance for longevity. Further, the angle-interlocked architecture can help to trap any broken fibers so that the structural integrity of the outer fabric layer 145 is not significantly impacted by the presence of such fibers. Although the outer fabric 145 is depicted as being formed form two layers 159 of weft fibers, in other embodiments, the outer fabric layer 145 can be formed from three or more layers 159 woven together in an angle-interlock architecture. In still other embodiments, the outer fabric layer 145 may be formed from just a single layer 159 of weft fibers.

The sewing threads 150 can include outer threads 151 and inner threads 152. The outer threads 151 are positioned adjacent to the outer surface 142 and the inner threads 152 positioned adjacent to the inner surface 143. In some embodiments, the threads 150 are formed from the same fibers that form the outer fabric layer 145. For example, in embodiments for which the outer fabric layer 145 is formed from metal alloy fibers, the inner and outer threads 152 and 151 can also be formed from the metal alloy fibers. In other embodiments, however, the inner and outer threads 152 and 151 can be formed form different fibers. For example, in some embodiments, the outer threads 151 can be formed from metal alloy fibers while the inner threads 152 are formed from Kevlar® fabric fibers. In some embodiments, a CNC sewing machine can be used to stitch the outer fabric layer 145, the layer of insulation, and the inner fabric layer 146 together.

Threads 150 are used to stitch the outer fabric layer (e.g., the weft fibers combined with the warp fibers) to the structure below. The threads 150 can be arranged in any suitable pattern. In representative embodiments, the threads 150 can be arranged to form a plurality of columns 154. The columns 154 can be configured such that, when the thermal protection apparatus 140 is coupled to the nozzle 121, the columns 154 generally align along the vehicle axis V (FIG. 1). In this way, when the launch vehicle is in flight, the columns 154 are generally parallel to the first and second directions 101 and 102 (FIG. 1). In some embodiments, the columns 154 are arranged such that adjacent columns 154 are separated from each other by approximately 0.25 inches. In other embodiments, adjacent columns 154 can be separated from each other by a different distance. For example, in some embodiments, adjacent columns 154 can be separated from each other a distance between approximately 0.125 and 0.5 inches. In some embodiments, the threads 150 can also be arranged to form one or more rows 153 that extend generally perpendicular to the columns 154 (i.e., the rows 153 are generally perpendicular to the vehicle axis V and to the first and second directions 101 and 102). In some embodiments, the threads 150 can be arranged such that adjacent rows 153 are spaced apart by a distance greater than the distance between adjacent columns 154. For example, adjacent columns 154 can be spaced apart by a distance larger than or equal to 1 inch. In these embodiments, the threads 150 are arranged such that columns 154 are more densely packed than the rows 153 (i.e., the number density of the columns 154 per unit area is greater than the number density of the rows 153 per unit area). In other embodiments, however, the threads 150 can be arranged such that adjacent rows 153 can be spaced apart from each other by a distance similar to the distance between adjacent columns 154.

In some embodiments, the launch vehicle 110 can be designed to fly in inclement weather, such as on rainy days. When the launch vehicle 110 is launched in inclement weather, rain drops (or other forms of atmospheric condensation) can impact the thermal protection apparatus 140 at high speeds. These high-speed rain drops typically travel in a direction perpendicular to the rows 153 (e.g., second direction 102) such that, if rain drops impact a thread 150 that forms one of the rows 153, the rain drop can pull on the thread 150, causing the thread 150 to stretch and deform.

The deformed threads 150 can increase the surface roughness of the thermal protection apparatus 140, which can increase the heating on the outer fabric layer 145. The rain drops can even cause the thread 150 to be pulled out of the thermal protection apparatus 140. In contrast, the threads 150 that form the columns 154 may not be significantly affected by the rain. Accordingly, in some embodiments, the thermal protection apparatus 140 may not include any rows 153 and may only include columns 154, which are generally parallel to the direction of travel of the vehicle and are therefore less prone to being pulled out by the rain drops. In other embodiments the apparatus 140 includes some rows 153, but fewer rows 153 than columns 154.

In some embodiments, the outer fabric layer 145 can be formed from more than one type of fiber. For example, in some embodiments, the outer fabric layer 145 can include an outer layer of metal alloy fabric stacked on and stitched to one or more layers of quartz fabric and/or ceramic fabric. While the metal alloy fibers have useful thermal and mechanical properties, the metal alloy fibers are dense, so forming the outer fabric layer 145 exclusively from metal alloy fibers can increase the weight of the thermal protection apparatus 140. By forming the outer fabric layer 145 from both metal alloy and quartz/ceramic fibers, the weight of the outer fabric layer 145 can be reduced while still taking advantage of some of the beneficial thermal and mechanical properties associated with metal alloys. In still other embodiments, the outer fabric layer 145 includes individual metal alloy fibers woven into layers of quartz and/or ceramic fibers to improve the thermal and mechanical properties of the outer fabric layer 145 without significantly affecting the weight of the layer 145. Further, the metal alloy fibers can be more electrically conductive than the quartz and ceramic fibers and can therefore better withstand lightning strikes, discharge electricity, and/or avoid charge build-up due to lightning, static charges, and/or other sources.

When the outer fabric layer 145 is exposed to heat, the layer of insulation 147 adjacent to the outer fabric layer 145 is also exposed to heat. To prevent or at least restrict the heat from passing through the layer of insulation 147 to the nozzle 121, the insulation 147 can be formed from a material or materials having high temperature capabilities and low thermal conductivity. In some embodiments, the layer of insulation 147 comprises insulation formed from small diameter (~1-3 μm) ceramic fibers (e.g., Saffil® alumina fibers or HSA fibers available from Unifrax) that maintain their thermal and structural properties up to very high temperatures (2900° F. for Saffil® fibers and 2000° F. for HSA fibers), are efficient at rejecting radiant heat, and have low thermal conductivity. In some embodiments, the layer of insulation 147 can be formed from multiple sheets of insulation stacked together. For example, in some embodiments, multiple sheets of 0.125-inch-thick insulation can be stacked together to form the layer of insulation 147. In some embodiments, the layer of insulation can include between 1 and 10 sheets of insulation stacked together.

To further increase the insulating properties of the thermal protection apparatus 140, the layer of insulation 147 can be at least partially saturated with water. Water has both a high heat capacity and a high heat of vaporization. Accordingly, a large amount of heat is required to both increase the temperature of the water and to vaporize the heated water. However, water is dense and incorporating water can increase the weight of the launch vehicle 110 (FIG. 1), and therefore the cost associated with manufacturing and/or launching the launch vehicle 110. To account for this effect, the thickness T of the thermal protection apparatus 140 can be small. For example, in some embodiments, the thickness T can be between 0.125 and 0.5 inches. At this thickness, the thermal protection apparatus 140 is still capable of providing a sufficient amount of insulation and cooling to each of the nozzles 121 without severely affecting the weight of the launch vehicle 110. Further, a thin thermal protection apparatus 140 can reduce the maximum possible peel loads that can be applied to the edge of the thermal protection apparatus 140 and therefore reduce the risk of the thermal protection apparatus separating from the nozzle 121 during descent.

The inner fabric layer 146 can be formed from woven fibers and can be used to contain the layer of insulation 147. Further, the inner fabric layer 146 can act as a backing material for the threads 150. In some embodiments, the inner fabric layer 146 is formed from woven fiberglass fabric (e.g., S2-glass fabric). In other embodiments, the inner fabric layer 146 can be formed from other suitable fabrics, such as Kevlar. The inner fabric layer 146 is generally not exposed to temperatures as high as those experienced by the outer fabric layer 145, and so a wider range of materials are suitable.

In some embodiments, the thermal protection apparatus 140 is saturated with water before the launch vehicle launches. The water can be stored in an external vessel and sprayed onto the thermal protection apparatus 140 prior to launch using a hose or other spraying apparatus, with the water soaking into the apparatus 140 through gaps in the fibers that form the outer fabric layer 145 and wicking throughout layer 147. Alternatively, the thermal protection apparatus 140 can include a water distribution system 134 that includes conduits (e.g., drippers, pipes, tubes, hoses, etc.) positioned throughout the thermal protection apparatus 140. In some embodiments, the conduits can be arranged between the inner fabric layer 146 and the exterior surface 123 of the nozzle 121 (e.g., within the adhesive 144) and can extend through the inner fabric layer 146 into the layer of insulation 147. In still other embodiments, the conduits can be arranged along an edge of the thermal protection apparatus 140 so that gravity and/or other forces can distribute the water to the rest of the thermal protection apparatus 140. The water distribution system 134 can be couplable to an on-board and/or off-board water source 133 to distribute water throughout the thermal protection apparatus 140 and wet and saturate the layer or part of the layer of insulation 147 before launch. Because the layer of insulation 147 can rapidly distribute the water via wicking, the water distribution system may be relatively sparse and/or non-uniform without significantly affecting the overall water distribution.

As the launch vehicle lifts off and ascends, the hot exhaust products heat the nozzles 121. The regenerative cooling systems within the nozzles 121 provide sufficient levels of cooling to the nozzles 121 while the propulsion system 120 is activated so that the temperature of the thermal protection apparatuses 140 does not increase significantly above the atmospheric temperature. As such, most of the water within the thermal protection apparatus 140 remains below its boiling point, and little water is initially lost to evaporation. As the launch vehicle ascends, both the temperature and the atmospheric pressure of the air surrounding the launch vehicle 110 decrease. As is well known in the art, the boiling temperature of water decreases with air pressure. As a result, some of the water within the thermal protection apparatus 140 can boil and evaporate out of the thermal protection apparatus 140 (e.g., through gaps in the fibers that form the fabric of the apparatus 140) as the launch vehicle continues to ascend, despite the cooler air temperatures. The water continues to cool and evaporate as the air temperature and pressure fall until the water begins to freeze. Once all of the water remaining within the thermal protection apparatus 140 freezes, between 20% and 50% of the water originally present in the thermal protection apparatus 140 may have evaporated during the ascent phase of the launch vehicle 110. The evaporated water pre-cools the structure but is not available to provide later cooling to the nozzles during the descent phase.

To supplement the cooling ability of the thermal protection apparatus 140, in some embodiments, the launch vehicle can include an onboard water source 133 (e.g., a vessel or tank) coupled to the water distribution system 134 to replenish the water lost to evaporation during ascent. In these embodiments, the onboard water source 133 is filled with water prior to launch and is activated to at least partially maintain the amount of water available for cooling and insulation during descent. Further, as the onboard water source 133 is only required to replenish a portion of the water that the thermal protection apparatus 140 can hold, the onboard water source 133 can be relatively small and need not contribute significantly to the weight of the vehicle. To ensure that the water within the onboard water source 133 does not freeze, the onboard water source 133 can be located in a portion of the launch vehicle (e.g., an insulated portion) that remains above freezing.

In other embodiments, the thermal protection apparatus 140 is not saturated with water before the launch vehicle takes off. Instead, the launch vehicle includes a larger onboard water source 133 that holds all of the water that the thermal protection apparatus 140 is to be saturated with, and the water distribution system 134 provides the water to the thermal protection apparatus 140 only after the launch vehicle takes off. In this way, the amount of water lost to evaporation during ascent can be reduced and the total amount of water carried by the launch vehicle can also be reduced.

While the outer fabric layer 145 can have some insulating properties and can be capable of repelling some heat, most of the heat passes through the outer fabric layer 145 towards the layer of insulation 147. This heat causes the ice in the layer of insulation 147 to sublimate or melt and causes the liquid water to heat up and evaporate. However, because water has a high heat of vaporization, a significant amount of heat is required to vaporize all of the water. Accordingly, the layer of insulation 147 remains at the boiling temperature for a long period of time even as additional heat is applied during the descent. Because the outer surface 142 heats up before the inner surface 143, water near the outer surface 142 evaporates out of the thermal protection apparatus 140 before water near the inner surface 143 does. This can result in the formation of a dry spot near the outer surface 142, which can heat up. However, the water near the inner surface 143 will also evaporate and move through the thermal protection apparatus 140 towards the outer surface 142. As it passes through the dry spot, the steam can absorb the extra heat from the dry spot, thereby cooling the dry spot.

The heated steam eventually evaporates out of the thermal protection apparatus 140, thereby removing heat from the thermal protection apparatus 140 in the process. Furthermore, the vaporized water reduces the amount of heat impinging on the thermal protection apparatus 140 by transpiring through the outer surface 142 and forming a relatively cool boundary layer between the thermal protection apparatus 140 and the outside air.

During the descent, some portions of the thermal protection apparatus 140 can be exposed to more heat than other portions. For example, the portions of the thermal protection apparatus 140 far from the heat shield 131 (FIG. 2) can receive more heat than the portions of the thermal protection apparatus 140 near the heat shield. Because of this, some of the water can be heated more rapidly, and therefore can evaporate more rapidly, than the rest of the water, resulting in the formation of dry spots. This can potentially result in a hot spot forming within the thermal protection apparatus 140 because the dry spots typically provide less cooling and insulation to the nozzles 121 (and/or other structures) than the wetter portions of the thermal protection apparatus 140. However, the small diameter fibers that form the insulation 147 have a very high surface energy compared to water and therefore have a high wicking ability. As a result, water readily adheres to the fibers and is capable of quickly moving along the fibers via wetting and wicking. In this way, the layer of insulation 147 can remain evenly wetted throughout the entire layer because the water readily flows from areas having relatively high concentrations of water to areas having relatively low concentrations of water, thereby mitigating at least some of the effects of differing heat exposure levels.

Toward the end of the descent, the propulsion system 120 (FIG. 2) can reactivate to slow the descent of the first stage 113. Once the propulsion system 120 (FIG. 2) is activated, the regenerative cooling systems also reactivate, thereby providing additional cooling to the nozzles 121. Furthermore, as the first stage 113 slows, the temperatures and pressures applied to the thermal protection apparatus 140 due to friction generally decrease, causing the amount of heat being applied to the thermal protection apparatus 140 to also decrease. Accordingly, the temperature of the thermal protection apparatus 140 and any water remaining within apparatus 140 also decreases. Once the first stage 113 lands and the propulsion system 120 deactivates, the thermal protection apparatuses 140 and the nozzles 121 can return to the ambient temperature.

While saturating the layer of insulation 147 with water increases the insulating and cooling properties of the thermal protection apparatus 140, if the thermal protection apparatus is not expected to be exposed to temperatures above 2000° F., the thermal protection apparatus 140 can also be used without saturating the layer of insulation 147 with water. For example, some portions of the first stage of the launch vehicle do not experience temperatures greater than 2000° F. Accordingly, in some embodiments, the thermal protection apparatus 140 can be positioned around and adhered to the exterior surface 123 of each of the nozzles 121 (and/or other vehicle surfaces) without saturating the layer of insulation 147. In contrast, the heat shield of a reentry vehicle that reenters the atmosphere from orbit often experiences temperatures well above 2000° F. Accordingly, the thermal protection apparatuses 140 for such a vehicle may be saturated with water even if the thermal protection apparatuses 140 for the first stage are not.

By using the thermal protection apparatuses 140 without water, the weight of the launch vehicle 110 can often be decreased and the operating cost of launching the launch vehicle 110 can also decrease. To offset the absence of water, the thermal protection apparatus 140 can include a thicker layer of insulation 147. To prevent water from being absorbed by the thermal protection apparatus 140 (e.g., due to weather such as rain or snow, etc.), in some embodiments, the thermal protection apparatus 140 can include waterproofing that is applied to the thermal protection apparatus 140. In some embodiments, the entire thermal protection apparatus 140 is waterproofed. In other embodiments, only a portion of the thermal protection apparatus may be waterproofed. For example, in embodiments for which the layer of insulation is formed from multiple sheets of insulation stacked together, some of the insulation sheets can be waterproofed while other sheets may not be. More specifically, the innermost sheet of insulation (i.e., the sheet positioned closest to the nozzle 121) may not be waterproofed (and can still be saturated with cooling water) while the outer sheets of insulation (i.e., the sheets positioned further from the nozzle 121) may be waterproofed. With this arrangement, the amount of water for cooling can be reduced while also allowing the outer fabric layer 145 to remain hot so that it radiates heat and reduces the need for convective heat transfer. The waterproofing may help to limit the amount of water that the thermal protection apparatus 140 absorbs so that the weight of the launch vehicle 110 is not affected by inclement weather. However, the high temperatures associated with the launch and descent of the launch vehicle 110 can burn off some of the waterproofing. As such, the waterproofing may need to be reapplied between launches.

Figure 4:
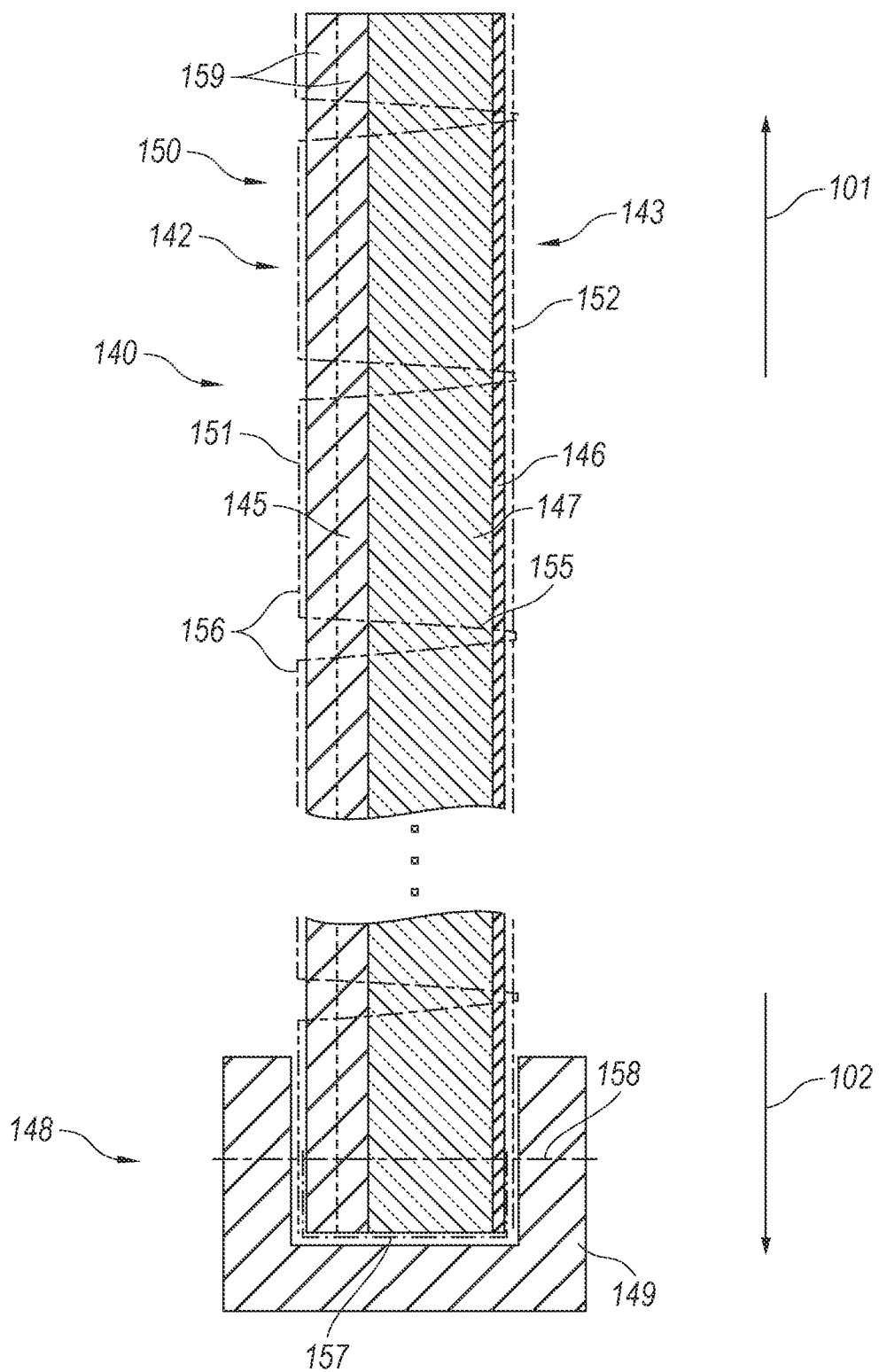
FIG. 4 is a partially schematic, cross-sectional view of the thermal protection apparatus shown in FIG. 2, configured in accordance with embodiments of the present technology.

FIG. 4 shows the thermal protection apparatus 140 oriented generally vertically, to illustrate representative manufacturing and water retention techniques. To couple the fabric layers 145 and 146 and the layer of insulation 147 together, the outer threads 151 can include a plurality of connecting portions 155 that extend from the outer surface 142 to the inner surface 143 by passing through the sheets 159 of the outer fabric layer 145, the layer of insulation 147, and the inner fabric layer 146. Each of the outer threads 151 can also include a plurality of surface portions 156, with each of the connecting portions 155 separated from an adjacent connecting portion 155 by one of the plurality of surface portions 156. In some embodiments, each of the surface portions 156 can have a length of approximately 0.25 inches such that each of the connecting portions 155 is separated from an adjacent connecting portion 155 by approximately 0.25 inches. In other embodiments, the surface portions 156 can have a length between 0.125 and 0.5 inches. During the manufacturing process, the layers of the thermal protection apparatus 140 are stitched together such that each of the connecting portions 155 extends through the outer fabric layer 145, the layer of insulation 147, and the inner fabric layer 146 and overlaps with one of the plurality of inner threads 152, thereby coupling the outer threads 151 to the inner threads 152. Further, in embodiments where the outer threads 151 are arranged in rows and columns (e.g., rows 153 and columns 154 shown in FIG. 3), both the rows and the columns of the outer threads 151 can include connecting portions 155 that overlap with the rows and columns of the inner threads 152. As a result, the outer fabric layer 145, the layer of insulation 147, and the inner fabric layer 146 are securely held in place by the inner and outer threads 152 and 151.

In embodiments of the thermal protection apparatus 140 that incorporate liquid water, the high wicking and wetting ability of the insulation fibers enable the liquid water to easily flow throughout the entire layer of insulation 147. As such, when the thermal protection apparatus 140 accelerates, the liquid water tends to flow through the layer of insulation 147 in a direction opposite the direction of acceleration. For example, during ascent, the launch vehicle accelerates in the first direction 101 and the liquid water moves in the second direction 102 towards an end portion 148 of the thermal protection apparatus 140. The end portion 148 can be adjacent to the opening of the nozzle 121 shown in FIG. 2. To limit the ability of the liquid water to freely flow out of the end portion 148, the end portion 148 can be sealed. The vertical extent of each section of the thermal protection apparatus 140 can be designed/controlled to reduce the water column height (e.g., the "head") and therefore the tendency for water to flow out of the end portion 148.

In some embodiments, the thermal protection apparatus 140 can include edge binding 149 positioned around the perimeter of the thermal protection apparatus 140 and stitched to the thermal protection apparatus 140 with a perimeter stitch 158. The edge binding 149 can include a strip of flexible fabric that wraps around the edge portions 148 and extends from the outer surface 142 to the inner surface 143. In some embodiments, the edge binding 149 is formed from the same fabric that forms the outer fabric layer. For example, in embodiments where the outer fabric layer 145 comprises metal alloy fibers, edge binding 149 can also comprise the metal alloy fibers. In other embodiments, however, the edge binding 149 can be formed from a different material than the fabric that forms the outer fabric layer 145. The perimeter stitch 158 can be formed from the same type of fibers that form the inner and outer threads 152 and 151. The edge portion 148 can also include waterproofing 157 applied to the edge binding 149. The waterproofing 157 acts as a barrier that limits the flow of water to prevent, or at least partially prevent, water from flowing through the edge binding 149. The waterproofing 157 can be or can include silicone and/or other suitable materials.

In the embodiments shown in FIGS. 1-3, the thermal protection apparatus 140 is positioned around the exterior surfaces 123 of the nozzles 121 to provide cooling and insulation to the nozzles 121. In other embodiments, however, the thermal protection apparatus 140 can be positioned to cool and insulate other portions of the launch vehicle. For example, in some embodiments, the heat shield 131 can include a plurality of the thermal protection apparatuses 140 arranged in an array. In other embodiments, at least a portion of the body of the first stage 113 can be covered by the thermal protection apparatuses 140. In still other embodiments, the thermal protection apparatus 140 can be coupled to the second stage (e.g., the second stage 114 shown in FIG. 1) to cool and insulate the second stage. In yet further embodiments, the thermal protection apparatus 140 can be positioned to cool and insulate portions of a third launch vehicle stage (e.g., a crew capsule), and/or another type of space vehicle.

Figure 5:
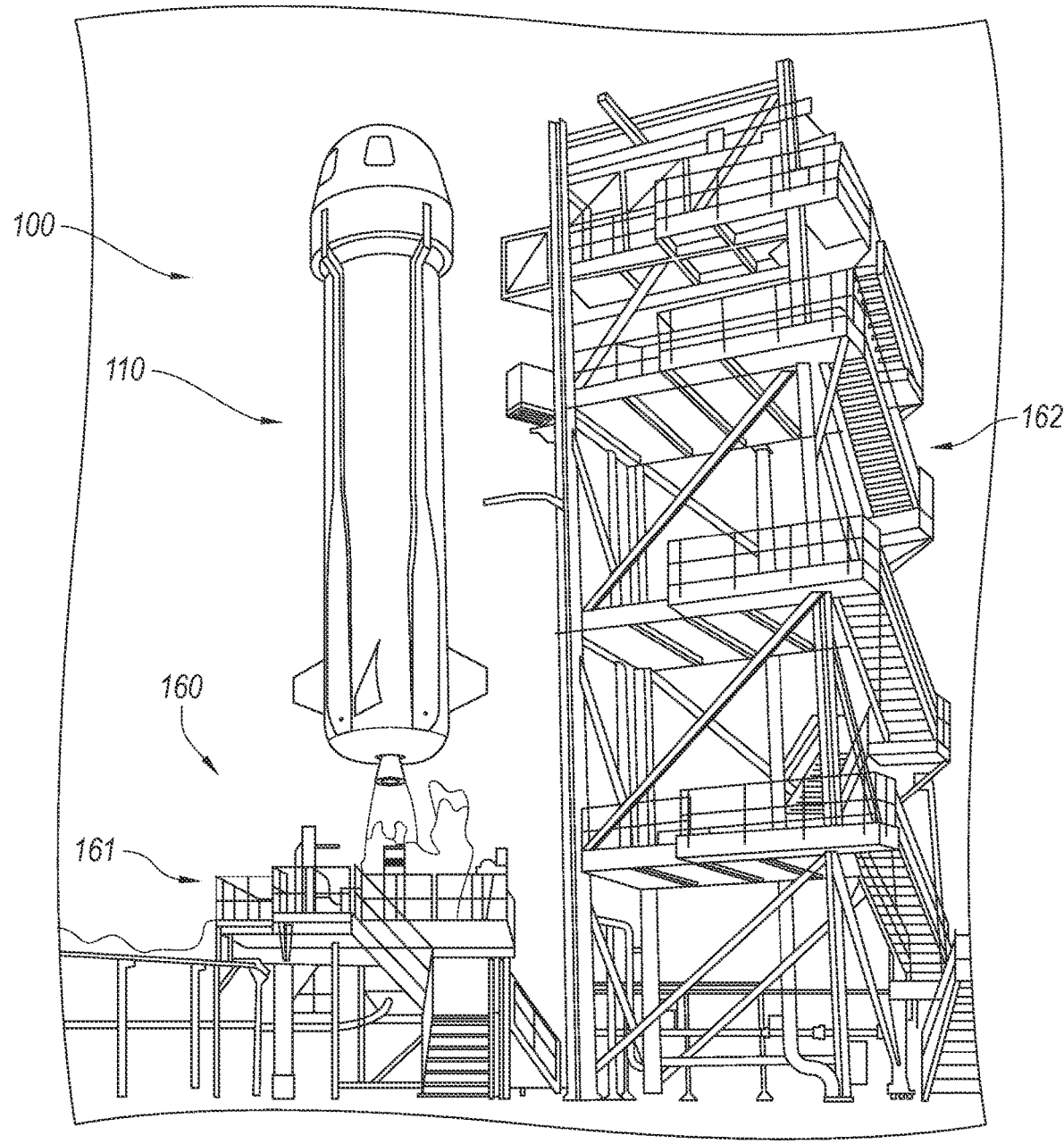
FIG. 5 is an isometric view of a launch site and a launch vehicle taking off from the launch site, in accordance with embodiments of the present technology.

In addition to providing cooling and insulation to portions of the launch vehicle, the thermal protection apparatus 140 can be used to provide cooling and insulation to other portions of the system. For example, FIG. 5 illustrates an isometric view of the system 100 that includes the launch vehicle 110 taking off from a launch site 160 having a platform 161 and a tower 162. Before the launch vehicle takes off from the launch site 160, the launch vehicle 110 is positioned in a generally vertical orientation on the platform 161 and coupled to the tower 162, which is used to stabilize and service the launch vehicle 110. For example, when the launch vehicle 110 is secured at the launch site 160, the tower 162 can be used to access a payload (e.g., the payload 115 shown in FIG. 1) within the launch vehicle 110. Further, both the platform 161 and the tower 162 can include supply conduits that provide supplies (e.g., fuel, water, air, etc.) to the launch vehicle 110 and various ground service equipment (e.g., cables, sensors, control systems, etc.) used during the launch of the launch vehicle 110.

Heat given off by the propulsion system when the launch vehicle 110 lifts off can damage the platform 161 and/or the tower 162, including the supply conduits, electronic components, and other components. To protect these and other portions of the launch site 160, the thermal protection apparatus can be applied to at least some portions of the launch site 160. For example, the thermal protection apparatus can be applied to the ground service equipment that houses various electronic components and cables so as to protect the electronic components from damage. The thermal protection apparatus can also be applied to portions of the tower 162 adjacent to a second stage of the launch vehicle 110 (e.g., a shelter room) so that technicians, astronauts, or other personnel are protected from high temperatures. Further, the launch site 160 can include a water vessel (e.g., a water tank) and the thermal protection apparatuses can be at least partially saturated with water from the water vessel to provide further cooling and insulation. In some embodiments, a conduit (e.g., a hose) coupled to the water vessel can be used by a technician to spray the thermal protection apparatuses with the water while in other embodiments, a water distribution system that includes conduits distributed throughout the thermal protection apparatuses and coupled to the water vessel can be used to distribute water from the water vessel to the thermal protection apparatuses, as discussed above. In this way, the thermal protection apparatuses can provide cooling and insulation to the various components at the launch site 160 so that the components can be protected from heat when the launch vehicle 110 takes off. Other portions of the system 100, such as the landing site, can also include the thermal protection apparatus.

In addition to increasing the insulation and cooling properties of the thermal protection apparatus 140, saturating the thermal protection apparatus 140 with water can also provide other benefits. For example, saturating the thermal protection apparatus 140 with water can reduce, or even eliminate, the infrared signature of the launch vehicle by reducing the apparent temperature difference between launch vehicle and the background (e.g., the sky). As a result, infrared detectors are less able to distinguish between the launch vehicle and the background, which can make it harder for the launch vehicle to be tracked and/or targeted during flight.

Test Results

Figure 6:
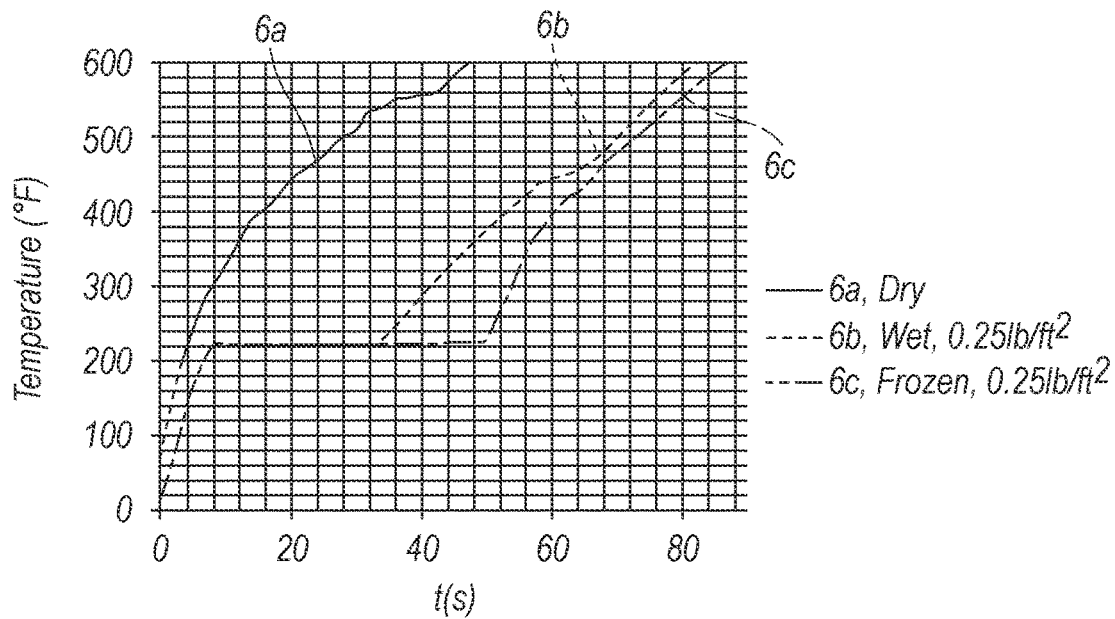
FIGS. 6 and 7 illustrate results from tests of samples of representative thermal protection components having different initial operating conditions and dimensions, in accordance with embodiments of the present technology.
Figure 7:
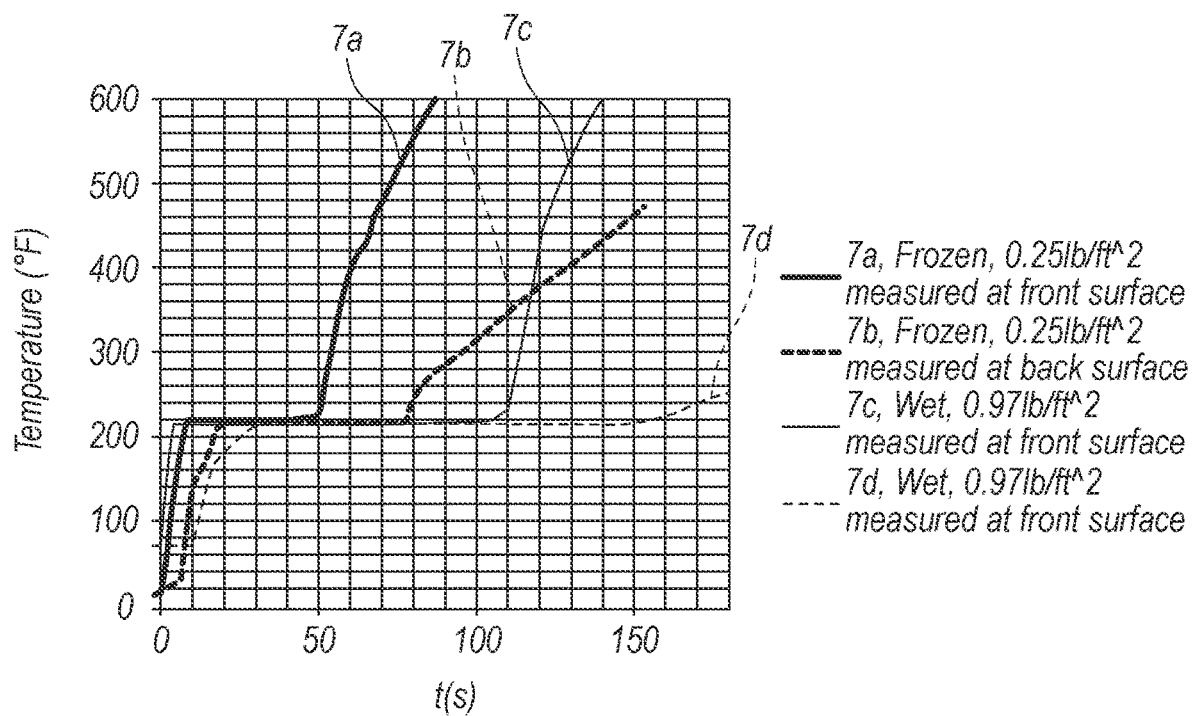

Several tests have been conducted to demonstrate the insulating performance of the thermal protection apparatus. The test results shown in FIGS. 6 and 7 provide general indications of the cooling and insulating properties of representative thermal protection apparatuses but may not be specific to actual installations of the thermal protection apparatus. FIG. 6 shows the results of a test that compares the insulating and heat absorption properties of the thermal protection apparatus when dry, wet, and frozen. The dry sample was not saturated with water, the wet sample included water having an areal density of 0.25 lb/ft$^2$, and the frozen sample included ice having an areal density of 0.25 lb/ft$^2$. In this test, the three samples were each sandwiched between a front aluminum plate and a back aluminum plate such that the outer fabric layer was adjacent to the front plate, the inner fabric layer was adjacent to the back aluminum plate, and the two aluminum plates were separated from each other by a gap of 0.064 inches. A torch providing a local heating of 30 BTU/ft$^2$/s was positioned approximately an inch away from the two plates and a thermocouple (positioned between the outer fabric layer and the front aluminum plate) was used to measure the temperature over time. Although the thermocouple was in direct contact with the front aluminum plate, it was also in direct contact with the thermal protection apparatus and the measured temperature was likely between the temperature of the aluminum and the temperature of the apparatus.

For the dry sample, the measured temperatures, which are represented by line 6a, rose quickly from an initial temperature of 70° F. to a temperature near the boiling point of water (i.e., 212° F.) after approximately 4 seconds. The temperature continued to rise quickly and reached a temperature of 400° F. after 16 seconds and a temperature of 600° F. after 48 seconds. For the wet sample, the measured temperatures, which are represented by line 6b, initially rose at a similar rate, reaching the boiling point of water after about 4 seconds. However, the measured temperature remained at this temperature for another 28 seconds (i.e., 32 seconds after heating began). The temperature then began to increase again and reached a temperature of 400° F. after another 22 seconds (i.e., 54 seconds after heating began) and a temperature of 600° F. after an additional 28 seconds had elapsed (i.e., 82 seconds after heating began). For the frozen sample, the measured temperatures, which are represented by line 6c, initially rose at a rate similar to that of the dry and wet samples, reaching a temperature near the boiling point of water (from an initial temperature of about 20° F.) in only 8 seconds. The frozen sample then remained at this temperature for a prolonged period of time, staying at the boiling temperature of water for approximately 42 seconds (i.e., after 50 total seconds of heating). The temperature then began to increase again and reached a temperature of 400° F. 11 seconds later (i.e., after 61 total seconds of heating) and a temperature of 600° F. after an additional 25 seconds of heating (i.e., 86 seconds after heating began).

These results demonstrate, in situ, the insulating effects of a representative thermal protection system that includes water. Once the temperature of the thermal protection apparatus reached the boiling point of water, the liquid water began to vaporize. However, the temperature remained at or near the boiling point of water for a prolonged amount of time because subsequent heat applied to the apparatus vaporized more of the liquid water instead of heating up the steam or the apparatus. Once all of the water vaporized, the measured temperature again began to rise at a rate similar to that of the dry sample.

For the frozen sample, the measured temperature initially rose at a comparable rate to the dry and wet samples, indicating that ice near the front plate melted soon after heating began and the temperature of the liquid water began to rise before the rest of the ice in the sample (e.g., ice near the back plate and ice near the edges of the plates) melted. Once the temperature reached the boiling point of water, the temperature remained at the boiling point of water for a longer period of time than the temperature of the wet sample did. However, this may be an artifact of the test set-up as the thermocouple is placed near the front plate and is only measuring the temperature near the front plate. Because the ice near the front plate melts and warms sooner than the ice near the back plate, the temperature measured by the thermocouple is only representative of the temperature of the water near the front plate and not the average temperature of the water. As such, the measured temperature of the frozen sample reached the boiling temperature quickly and stayed at the boiling temperature for a longer period of time than the temperature of the wet sample did despite the average temperature of the water taking longer to reach the boiling temperature. As more heat was applied, more of the ice melted and the liquid water continued to warm up until all the water reached the boiling temperature. Once all the ice melted and vaporized, the measured temperature began to rise again at a rate higher than that of the wet or dry sample. This may be due to more steam evaporating from the frozen sample before the temperature began to rise because the water at the front of the frozen sample stayed at the boiling temperature for a longer period of time than the water at the front of the wet sample did. Further, after 65 seconds of heating, the frozen and wet samples were at approximately the same temperature and continued to heat at the same rate.

FIG. 7 illustrates the results from another test that shows the effect of increasing the thickness of the layer of insulation (and therefore the thickness T of the thermal protection apparatus and the amount of water it carries), and also shows the differences between the temperature measured at the front of the sample and the temperature measured at the back of the sample. In this test, the insulating and heat absorption properties of a frozen sample of the thermal protection apparatus were compared to the insulating and heat absorption properties of a wet sample having an increased thickness. For the frozen sample, the gap between the front and back aluminum plates (i.e., the thickness of the frozen sample) was set to 0.064 inches and the frozen sample was saturated with ice such that the ice had an areal density of 0.25 lb/ft$^2$. For the wet sample, the gap between the two plates (i.e., the thickness of the wet sample) was 0.231 inches and the wet sample was saturated with water such that the water had an areal density of 0.97 lb/ft$^2$. For this test, a front thermocouple was positioned between the outer fabric layer and the front aluminum plate and a back thermocouple was positioned between the inner fabric layer and the back aluminum plate. With this setup, the difference in temperature measured at the front of the thermal protection apparatus and at the back of the thermal protection apparatus could be determined.

For the frozen sample, the temperatures measured by the front thermocouple, which are represented by line 7a, are consistent with the results shown in FIG. 6, with the temperature rising to the boiling point of water point after approximately 8 seconds, remaining at this temperature for 40 seconds, and then rising to 400° F. and 600° F. after approximately 61 seconds and 86 seconds (total elapsed time), respectively. The temperatures measured by the back thermocouple, which are represented by the line 7b, are significantly lower than those measured by the front thermocouple. At the back of the frozen sample, the temperature rose at a steady rate initially but did not reach a temperature near the boiling temperature of water until almost 20 seconds of heating had passed, taking nearly 12 seconds longer to reach this temperature than the front of the sample did. This indicates that thermal protection apparatus absorbed and dissipated much of the applied heat. The back of the frozen sample remained at this temperature for approximately 57 seconds (i.e., after 77 total seconds of heating) and then began to increase in temperature again, reaching a temperature of 400° F. after 128 seconds of heating had elapsed.

For the wet sample, which was thicker and included more water than the frozen sample, the temperatures measured by the thermocouple at the front of the sample, which are represented by line 7c, initially appear to be consistent with the results for the wet sample shown in FIG. 6. The measured temperature quickly rose to a temperature near the boiling point of water after approximately 4 seconds of heating. Once it reached this temperature, the wet sample remained at the boiling temperature of water for another 100 seconds and did not begin to increase in temperature until after approximately 104 total seconds of heating. At this point, the temperature began to rise again and the front of the sample reached a temperature of 400° F. after 118 seconds of total heating and a temperature of 600° F. after 140 seconds of total heating. However, as in the frozen sample, the temperatures measured by the thermocouple located at the back of the wet sample are significantly different those measured by the front thermocouple. At the back of the wet sample, the measured temperatures, which are represented by line 7d, did not change until 10 seconds of heating had elapsed and the temperature reached the boiling temperature of water after 30 seconds of total heating had passed. The temperature remained at the boiling temperature for another 120 seconds (i.e., after 150 total seconds of heating) before slowly starting to increase at a rate substantially less than the temperature measured at the front of the wet sample.

The foregoing tests further demonstrate the efficacy of representative thermal protection apparatus samples, and the effects of varying water content. For both the frozen and wet samples, the temperatures measured at the back of the samples remained at the boiling temperature of water for a substantially longer period of time than the temperatures measured at the front of the sample. For example, after 70 seconds of heating, the temperature measured at the back of the frozen sample remained at the boiling temperature while the temperature measured at the front had increased to approximately 480° F. Similarly, after 140 seconds of heating, the temperature measured at the back of the wet sample remained at the boiling temperature of water while the temperature measured at the front increased to approximately 600 degrees. Furthermore, because the wet sample is substantially thicker and includes more water than the frozen sample, more heat is absorbed and dissipated by the wet sample than the frozen sample. As a result, the temperatures measured by both thermocouples coupled to the wet sample remained at the boiling temperature of water for substantially longer than the temperatures measured by the thermocouples coupled to the frozen sample.

Tests were also performed to determine the durability of the thermal protection apparatus. In one such test, samples of the thermal protection apparatus, as well as samples of conventional insulating blankets, were put into a high-speed and high-temperature wind tunnel to simulate the possible conditions that the thermal protection apparatus may be exposed to during vehicle launch. In these tests, the wind tunnel generated velocities of approximately Mach 4 and gas temperatures of about 2600° F. The various samples were inserted into the wind tunnel for up to a minute before being removed. For these tests, the thermal protection apparatus included an outer fabric layer formed from metal alloy fibers and was tightly stitched together with columns of threads (i.e., threads that are generally parallel to the direction of the airflow in the testing chamber) spaced apart from each other by approximately 0.25 inches and rows of threads (i.e., threads that are generally perpendicular to the direction of the airflow in the testing chamber) spaced apart from each other by approximately 1.7 inches. Because of this construction, the samples of the thermal protection apparatus, which had an outer surface temperature of approximately 2000° F. during testing, were undamaged after being exposed to the high-temperature and high-speed wind during testing. In contrast, when the insulating blankets made from conventional materials were inserted into the test chamber, the insulating blankets, which include an outer fabric layer formed from a conventional and less durable material (e.g., a ceramic material) and were stitched together with a 0.25-inch by 1.7-inch stitching pattern, disintegrated almost immediately. Accordingly, the improved materials and construction of the disclosed thermal protection apparatus offered significant improvement on the durability and performance over conventional insulation blankets.

Figure 8:
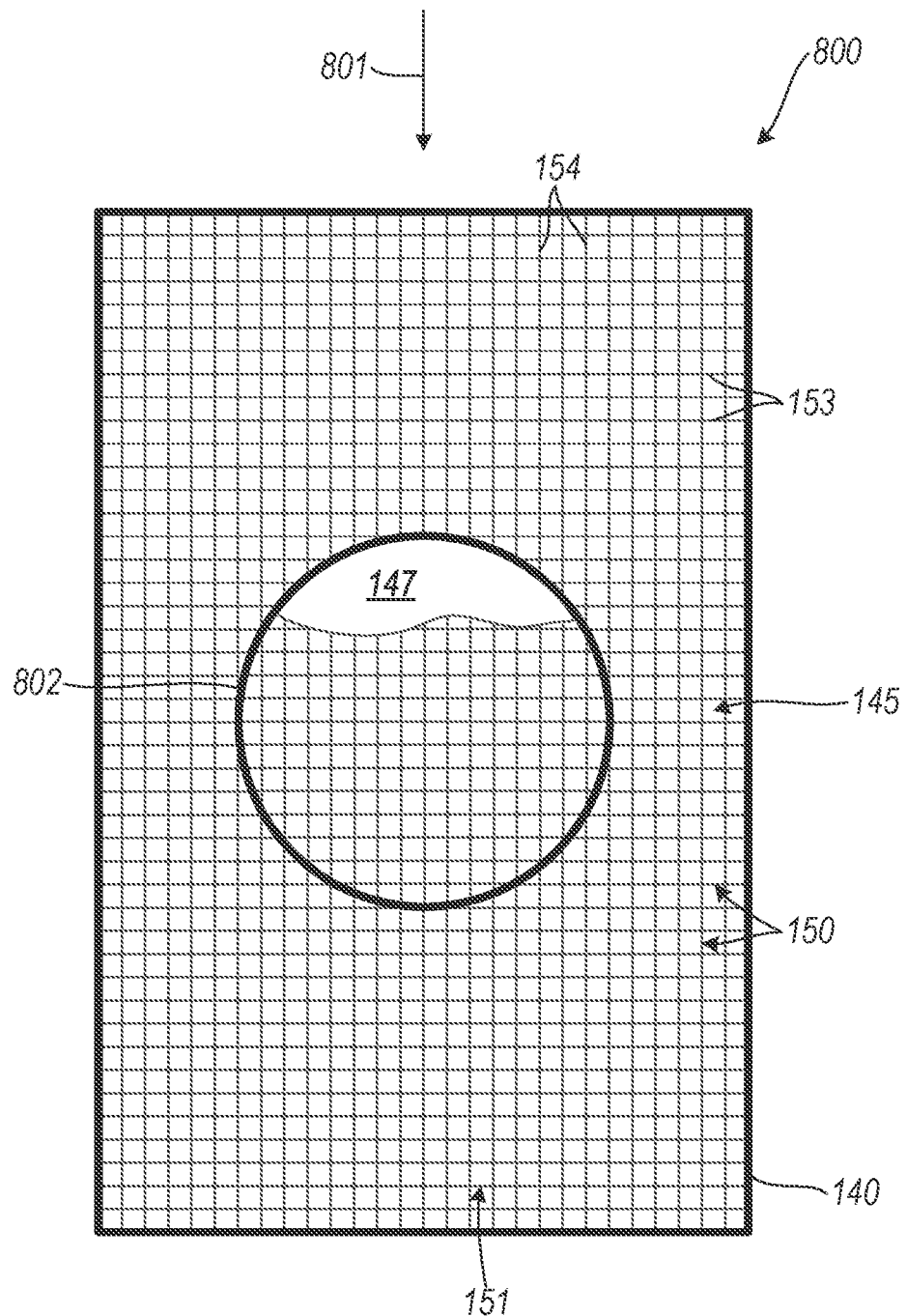
FIG. 8 is a top plan view of a test sample of representative thermal protection components after being exposed to high-temperature and high-speed air flows, in accordance with embodiments of the present technology.

Additional tests were also run on other samples of the disclosed thermal protection apparatus. For example, a sample of the thermal protection apparatus having a purposely introduced defect was also tested. FIG. 8 shows a top plan view of a sample 800 of the thermal protection apparatus 140 having a defect 802 into the outer surface 142 of the thermal protection apparatus 140. The defect was formed by cutting a circle into the outer fabric layer 145 and outer threads 151 before inserting the sample 800 into the test chamber. Arrow 801 shows the direction of the air within the chamber relative to the sample 800. During testing, the high-speed air caused a portion of the outer fabric layer 145 to peel away, causing the underlying layer of insulation 147 to be exposed. However, the tightly-stitched construction of the outer fabric layer 145 combined with the ductile behavior of the metal threads helped to retain the outer fabric so that the rest of the defect 802 did not peel away. The angle-interlock architecture also ensured that presence of the broken fibers did not cause the defect to propagate through the rest of the sample 800. A similar result is also expected for samples that do not include rows 153 of threads 150.

Tests for determining the ability of the thermal protection apparatus 140 to withstand lightning strikes were also conducted. In these tests, electrical currents of different strength were applied to samples of the apparatus 140 to simulate lightning strikes and the effect of the different currents on the samples were observed. In one test, a current of 100,000 amps was applied to a sample. The applied current caused minor damage to an area having approximately a 1-inch diameter. In a second test, a current of 200,000 amps was applied to a second sample. In this test, the applied current caused minor damage to an area having a diameter of approximately 2 inches. In both tests, however, the damage was limited to these localized areas of the samples. The other areas of the tested samples remained intact and were generally unaffected by the applied currents.

Conventional insulation blankets are typically too fragile to withstand the high acoustic environments experienced by the windward side of spacecraft during launch and reentry. Accordingly, conventional insulation blankets are relegated to the leeward side of the spacecraft. In contrast, the thermal protection apparatus 140 is durable enough to survive the extreme acoustic environments that the windward portions of the spacecraft (e.g., the heat shield of a launch vehicle or reentry module) experience during flight. To test the acoustic durability of the thermal protection apparatus 140, samples of the thermal protection apparatus were exposed to combined acoustic and thermal loads. In one test, samples were heated to a temperature of approximately 2000° F. and were exposed to an overall sound pressure level (OASPL) of 165 dB. After testing, the sample showed no signs of damage. A similar test was performed on a sample of conventional insulation blankets. After testing, most of the threads in the conventional insulation blanket sample were 80% broken. A second sample of the thermal protection apparatus 140 was tested using an even higher OASPL of 168 dB. As in the previous test, the sample showed no signs of damage after testing. These results demonstrate, in situ, the durability and reusability of representative thermal protection apparatuses, especially in comparison to conventional insulating blankets.

From the foregoing, it will be appreciated that several embodiments of the disclosed technology have been described herein for purposes of illustration, but that various modifications can be made without deviating from the technology. For example, in some applications, the thermal protection apparatus can be saturated with a liquid other than water and/or the thermal protection apparatus can include multiple layers of insulation. The thermal protection apparatus can be coupled to any portion of a launch vehicle and/or vehicles that do not ascend into space, such as airplanes and/or helicopters. The thermal protection apparatus can be applied to stationary structures such as furnaces and power plants. More generally, the thermal protection apparatus can be coupled to any structure to provide insulation and/or cooling to that structure.

Certain aspects of the technology described in the context of particular embodiments can be combined or eliminated in other embodiments. For example, the thermal protection apparatus can only include threading on the outer surface of the thermal protection apparatus but does not include separate threading on the inner surface. Further, while advantages associated with some embodiments of the disclosed technology have been described herein, configurations with different characteristics can also exhibit such advantages, and not all configurations need necessarily exhibit such advantages to fall within the scope of the technology. Accordingly, the disclosure and associated technology can encompass other arrangements not expressly shown or described herein. The following examples provide further representative descriptions of the present technology.

To the extent any materials incorporated herein by reference conflict with the present disclosure, the present disclosure controls. As used herein, the phrase "and/or" as in "A and/or B" refers to A alone, B alone, and both A and B.

We claim:

1. A thermal protection apparatus for an aerospace system, the thermal protection apparatus comprising:
    a first flexible layer;
    a second flexible layer;
    a layer of flexible insulation between the first flexible layer and the second flexible layer, wherein the layer of flexible insulation is configured to be saturated with water; and
    a water distribution system in direct contact with the layer of flexible insulation and positioned to provide water to the layer of flexible insulation to at least partially saturate the layer of flexible insulation.

2. The thermal protection apparatus of claim 1, wherein the water distribution system comprises one or more conduits extending into the layer of flexible insulation.

3. The thermal protection apparatus of claim 1, wherein the water distribution system comprises one or more conduits arranged along an edge of the layer of flexible insulation and positioned to provide water to the edge of the layer of flexible insulation.

4. The thermal protection apparatus of claim 1, further comprising a water source coupled to the water distribution system to provide water to the water distribution system.

5. The thermal protection apparatus of claim 1, wherein the first flexible layer, the second flexible layer, and the layer of flexible insulation are stitched together.

6. The thermal protection apparatus of claim 1, wherein the first flexible layer comprises at least one of metal alloy fibers or ceramic fibers.

7. The thermal protection apparatus of claim 1, wherein the second flexible layer comprises woven fibers.

8. The thermal protection apparatus of claim 1, wherein the layer of flexible insulation comprises ceramic fibers.

9. The thermal protection apparatus of claim 1, wherein the layer of flexible insulation comprises a plurality of sheets of flexible insulation stacked together.

10. The thermal protection apparatus of claim 9, wherein at least one, but not all, of the sheets of flexible insulation comprises a waterproofing material.

11. The thermal protection apparatus of claim 1, further comprising an edge binding extending from a surface of the first flexible layer to a surface of the second flexible layer.

12. The thermal protection apparatus of claim 11, wherein the edge binding comprises a waterproofing material.

13. An aerospace system comprising a thermal protection apparatus, the thermal protection apparatus comprising:
 a layer of flexible insulation, wherein the layer of flexible insulation is configured to be saturated with water; and
 a water distribution system in direct contact with the layer of flexible insulation and positioned to provide water to the layer of flexible insulation to at least partially saturate the layer of flexible insulation.

14. The aerospace system of claim 13, comprising a launch vehicle, wherein the thermal protection apparatus is at least partially positioned on a surface of the launch vehicle.

15. The aerospace system of claim 14, wherein the surface of the launch vehicle is a surface of a rocket engine nozzle.

16. The aerospace system of claim 14, further comprising a water source coupled to the water distribution system to provide water to the water distribution system.

17. The aerospace system of claim 16, wherein the water source comprises a vessel or tank carried by the launch vehicle.

18. The aerospace system of claim 16, wherein the water source comprises an off-board vessel or tank that is not carried by the launch vehicle.

19. The aerospace system of claim 13, comprising a tower configured to couple to a launch vehicle to secure the launch vehicle at a launch site, wherein the layer of flexible insulation is positioned on the tower.

20. The aerospace system of claim 13, wherein the water distribution system comprises one or more conduits extending into the layer of flexible insulation.

21. The aerospace system of claim 13, wherein the water distribution system comprises one or more conduits arranged along an edge of the layer of flexible insulation and positioned to provide water to the edge of the layer of flexible insulation.

22. The aerospace system of claim 13, wherein the layer of flexible insulation comprises a plurality of sheets of flexible insulation stacked together, and wherein at least one, but not all, of the sheets of flexible insulation comprises a waterproofing material.

23. The aerospace system of claim 13, further comprising one or more flexible layers stitched to the layer of flexible insulation to form one or more outer surfaces of the thermal protection apparatus.

24. The aerospace system of claim 23, wherein the one or more flexible layers comprises at least one of metal alloy fibers or ceramic fibers.

25. The aerospace system of claim 23, further comprising an edge binding positioned at an end portion of the thermal protection apparatus and contacting the one or more outer surfaces.

26. The aerospace system of claim 25, wherein the edge binding comprises a waterproofing material.

27. The aerospace system of claim 25, comprising a launch vehicle having a first end and a second end opposite the first end, wherein:
 the end portion is a first end portion of the thermal protection apparatus;
 the thermal protection apparatus comprises a second end portion positioned opposite the first end portion;
 the launch vehicle is configured to move in a first direction with the first end leading the second end;
 the thermal protection apparatus is positioned on a surface of the launch vehicle; and
 the second end portion of the thermal protection apparatus is positioned between the first end portion of the thermal protection apparatus and the first end of the launch vehicle.

28. The aerospace system of claim 27, wherein the surface of the launch vehicle is a surface of a rocket engine nozzle.

29. The aerospace system of claim 13, wherein the layer of flexible insulation comprises ceramic fibers.

30. A method of operating an aerospace system, the method comprising:
 launching a launch vehicle, wherein at least a portion of the launch vehicle carries a thermal protection apparatus comprising a layer of insulation, wherein the layer of insulation is positioned on a surface of the portion of the launch vehicle;
 saturating at least a portion of the insulation with water;
 causing at least a portion of the water to freeze; and
 vaporizing the water to carry heat away from the launch vehicle.

31. The method of claim 30, wherein saturating at least a portion of the insulation with water comprises directing water into the insulation before launching the launch vehicle.

32. The method of claim 30, wherein saturating at least a portion of the insulation with water comprises directing water into the insulation after launching the launch vehicle.

33. The method of claim 30, wherein launching the launch vehicle comprises launching the launch vehicle in an ascent direction, the method further comprising, after ascending, descending the portion of the launch vehicle, wherein saturating at least a portion of the insulation with water comprises directing water into the insulation while descending the portion of the launch vehicle.

34. The method of claim 30, wherein the portion of the launch vehicle is a rocket engine nozzle.

35. The method of claim 30, wherein saturating the portion of the insulation with water comprises directing water into the insulation via a water distribution system in direct contact with the layer of insulation.

36. The method of claim 35, wherein directing water into the insulation via the water distribution system comprises directing water through one or more conduits extending into the layer of insulation.

37. The method of claim 35, wherein directing water into the insulation via the water distribution system comprises directing water through one or more conduits opening to an edge of the layer of insulation.

38. The method of claim 35, wherein directing water into the insulation via the water distribution system comprises pumping the water.

39. The method of claim 30, wherein saturating the portion of the insulation with water comprises distributing the water into the portion of the insulation from a water source, wherein launching the launch vehicle comprises carrying the water source on the launch vehicle.

40. The method of claim 30, wherein saturating the portion of the insulation with water comprises distributing the water into the portion of the insulation from a water source external to the launch vehicle.

41. The method of claim 30, wherein:
- the thermal protection apparatus comprises a first layer on a first side of the layer of insulation and a second layer on a second side of the layer of insulation opposite the first side;
- the thermal protection apparatus comprises a first edge and a second edge positioned opposite the first edge, and an edge binding positioned at the second edge and extending from a surface of the first layer to a surface of the second layer; and
- launching the launch vehicle comprises launching the launch vehicle along a direction in which the first edge of the thermal protection apparatus leads the second edge of the thermal protection apparatus.

42. The method of claim 41, wherein saturating the portion of the insulation with water comprises directing water into the first edge via a water distribution system comprising one or more conduits.

* * * * *